(12) United States Patent
Bickle et al.

(10) Patent No.: US 7,367,020 B2
(45) Date of Patent: Apr. 29, 2008

(54) EXECUTABLE RADIO SOFTWARE SYSTEM AND METHOD

(75) Inventors: Gerald L. Bickle, Columbia City, IN (US); Jimmie T. Marks, Fort Wayne, IN (US); Philip A. Eyermann, Churubusco, IN (US)

(73) Assignee: Raytheon Company, Waltham, MA (US)

( * ) Notice: Subject to any disclaimer, the term of this patent is extended or adjusted under 35 U.S.C. 154(b) by 311 days.

(21) Appl. No.: 10/207,315

(22) Filed: Jul. 29, 2002

(65) Prior Publication Data

US 2003/0114163 A1 Jun. 19, 2003

Related U.S. Application Data

(60) Provisional application No. 60/308,270, filed on Jul. 27, 2001.

(51) Int. Cl.
G06F 9/45 (2006.01)

(52) U.S. Cl. ............... 717/143; 717/104; 717/106; 717/140; 455/414

(58) Field of Classification Search ........ 709/224–237, 709/238; 714/4, 752; 707/103 R, 1–10; 345/744; 455/422.1, 414; 717/168–174, 717/104, 106, 140, 143, 164; 706/60; 705/22
See application file for complete search history.

(56) References Cited

U.S. PATENT DOCUMENTS

| 5,708,780 | A | | 1/1998 | Levergood et al. ..... 395/200.12 |
|---|---|---|---|---|
| 5,923,879 | A | | 7/1999 | Sasmazel et al. ........... 395/705 |
| 6,101,501 | A | * | 8/2000 | Breslau et al. .......... 707/103 R |
| 6,122,671 | A | * | 9/2000 | Farrar et al. ................. 709/238 |
| 6,256,485 | B1 | | 7/2001 | Heard ..................... 455/161.1 |
| RE37,547 | E | | 2/2002 | Anagnost ................... 702/153 |
| 6,351,717 | B2 | | 2/2002 | Lambrecht ................. 702/97 |
| 6,446,058 | B1 | * | 9/2002 | Brown ........................ 706/60 |
| 6,766,368 | B1 | * | 7/2004 | Jakobson et al. ........... 709/224 |
| 6,772,216 | B1 | * | 8/2004 | Ankireddipally et al. ... 709/230 |
| 6,810,487 | B2 | * | 10/2004 | Sawai et al. .................. 714/4 |
| 7,051,098 | B2 | * | 5/2006 | Masters et al. ............. 709/224 |
| 7,127,701 | B2 | * | 10/2006 | Fables et al. ............... 717/104 |
| 7,165,040 | B2 | * | 1/2007 | Ehrman et al. ............... 705/22 |
| 2001/0039636 | A1 | * | 11/2001 | Hammons et al. .......... 714/752 |
| 2002/0128000 | A1 | * | 9/2002 | do Nascimento, Jr. ...... 455/414 |
| 2002/0184385 | A1 | * | 12/2002 | Kato ........................ 709/237 |
| 2003/0195825 | A1 | * | 10/2003 | Ehrman et al. ............... 705/28 |

(Continued)

OTHER PUBLICATIONS

*Software Communications Architecture Specification*, MSRC-5000SCA V2.2, Nov. 17, 2001, Modular Software-programmable Radio Consortium, Contract No. DAAB15-00-3-0001.

(Continued)

*Primary Examiner*—Meng-Al T. An
*Assistant Examiner*—Mark P. Francis
(74) *Attorney, Agent, or Firm*—Iandioro Teska & Coleman

(57) ABSTRACT

An executable radio software system including a core framework layer responsive to one or more applications and a middleware layer. The core framework layer includes isolated platform dependent code in one or more files for a number of different platforms each selectively compilable by a directive to reduce the dependency of the core framework layer on a specific platform. Also, the core framework layer includes an embedded distributed parser responsive to the Domain profiles of the applications for more efficiently installing and running an application.

10 Claims, 17 Drawing Sheets

U.S. PATENT DOCUMENTS

2004/0046787 A1* 3/2004 Henry et al. ................ 345/744
2005/0055322 A1* 3/2005 Masters et al. ................ 707/1
2005/0055350 A1* 3/2005 Werme et al. ................ 707/10
2005/0096034 A1* 5/2005 Petermann ............... 455/422.1

OTHER PUBLICATIONS

APPCO Project 16 900 MHz for Law Enforcement Communications, published 2000, p. 1.

Orfall, Robert et al., "Client Server Programming with JAVA and CORBA", second edition, pp. 1-60, 331-371, 433-518, 711-830 and 905-932, published Jan. 30, 1997.

Bickle, J., et al., "Software Radio Architecture (SRA) 2.0 Technical Overview", Internet Article, Dec. 2000, pp. 1-45.

Geib, M. "Writing Easily Portable Code" ICALEPCS '95, Int. Conf. on Accelerator adn Large Experimental Control Systems, Nov. 2, 1995 pp. 1-6.

Anonymous, "ICALEPS, '95-Schedule and Sessions", Internet Article, Oct. 3, 1995 pp. 1-3.

Frampton, S., "Coding Style Interview with wxWindows Developers", Internet Article, May 7, 2002 pp. 1-10 (8 pages total).

Davis, K.V., "JTRS—An Open, distributed-object computing software radio achitecture", Digital Avionics Systems Conference, 1999. Proceedings. Oct. 18, 1999, vol. 2, p. 9.A-6-1 to 9.A.6-8.

Gi-Ping Lee, Yue-Shan Chang, Shyan-Ming Yuan, "A software framework for software radio", Communication Technology Proceedings, 2000. WCC-ICCT 2000. International Conference on Aug. 2000, vol. 2, p. 1102 to 1105.

Moser, L.E., Melliar-Smith, P.M., Narasimhan, P., "A fault tolerance framework for CORBA", Fault-Tolerant Computing, 1999. Digest of Papers. Twenty-Ninth Annual International Symposium on Jun. 15-18, 1999, p. 150 to 157.

Mitola, J., III, "SDR architecture refinement for JTRS", MILCOM 2000. 21st Centrury Military Communications Conference Proceedings. vol. 1, Oct. 22-25, 2000, p. 214 to 218.

Fowler, Martin, "UML Distilled Applying the Standard Object Modeling Language," May 1997 pp. 1-179.

* cited by examiner

EXECUTABLE RADIO SOFTWARE SYSTEM AND METHOD

RELATED APPLICATIONS

This application claims priority of U.S. provisional application No. 60/308,270 filed Jul. 27, 2001 incorporated by reference herein.

GOVERNMENT RIGHTS

This invention was made with U.S. Government support under Contract No. DAAB15-00-3-0001 awarded by the Joint Tactical Radio System (JTRS) Joint Program Office (JPO), Suite 1000, 1700 Moore Street, Arlington, Va. 22209. The Government may have certain rights in the subject invention.

FIELD OF THE INVENTION

This invention relates to a software communication architecture for radios and other applications using embedded microprocessors.

COMPUTER PROGRAM LISTING APPENDIX

A computer program listing appendix is filed herewith on compact disk. The material on the compact disk is hereby incorporated by reference. Two identical compact disks have been submitted. Each compact disk contains two files:

DeviceManagerServant.out (786,432 bytes); and Abstract_x86_vxworks_v2_0h.out (1,245,184 bytes). The two disks were created on Jul. 24, 2002.

BACKGROUND OF THE INVENTION

Prior art proprietary radio solutions with non-reusable software are commonplace especially in military applications. Many existing radio communications systems were designed with mutually-exclusive architectures to perform a specific task. As such, they depart from milestones already achieved in technological advancements where communications systems use standardized open architectures and modular designs to deliver multiple communications and network functions from a single platform. In general, most current radio systems operate on a single frequency band and are limited to a single waveform and thus can generally operate only with like specified radios. In addition, such radio systems are not capable of simultaneous voice, video, and data operations, and do not employ a common open systems architecture. Others skilled in the art have attempted to solve some of the of these problems by introducing multichannel radios. Although this solution addresses the ability to operate simultaneous voice and data transmissions, it fails to employ either a modular design or the use of a common open systems architecture and thus inhibiting software portability.

In response, the Joint Tactical Radio System (JTRS) Joint Program Office promulgated a draft "Software Communication Architecture" (SCA) specification incorporated by this reference. The inventors hereof and others have undertaken, in the SCA specification, to set forth requirements to provide for a common open architecture that has the advantages of promoting competition, interoperability, technology insertion, quick upgrades, software reuse, extendibility, and scalability. Another goal of the SCA specification is to provide a family of radios able to support operations in a wide variety of Domains: airborne, fixed, maritime, vehicular, dismounted, and handheld. Still another goal of the SCA specification is to provide for multiple bands and multiple modes and to provide radios which interoperate in disparate portions of the 2 MHz to 2 GHz spectrum and to provide cross-banding between modes and waveforms. Still other goals of the SCA specification include providing compatibility with legacy systems, to enable technology insertion wherein new technologies can be incorporated, to reduce costs and time to field, to prevent obsolescence, and to keep pace with commercial technologies. The envisioned radio software architecture must also support emerging wideband networking capabilities for voice, data, and video and allow for the maximum possible reuse of waveform software.

To isolate the waveform applications from the radio hardware, the proposed radio software is organized into three layers: a processor environment layer, a middleware layer, and a "core framework layer" layer. The processor environment layer and the middleware layer are generally commercially available off-the-shelf products. The core framework layer layer, however, which is defined to be an open means to promote plug-and-play software interoperability, is currently being developed by a number of different suppliers. The purpose of the core framework layer is to deploy (load and execute) a distributed application in a controlled and secured manner. Due to the use of a Common Object Request Broker Architecture (CORBA® (middleware layer)) and Portable Operating System Interface (POSIX)-compatible open system environment, the core framework layer supported components must port with relative ease across different processors, Real Time Operating Systems (RTOSs), buses and Object Request Brokers (ORBs). Thus, the core framework layer is the essential set of open application interfaces and services that provide an abstraction of the underlying Commercial Off-The-Shelf (COTS) software and hardware. Portability is achieved by implementing this same set of core framework layer application program interfaces on every platform. Core framework layer services consist of a Domain Manager that implements system control, a Device Manager that loads software and manages a set of hardware devices, and core services such as Log, File Manager, and File System.

Herein, a novel core framework layer is disclosed which meets and in many respect exceeds the core framework layer requirements of the SCA specification.

A typical core framework layer implementation is application independent but could be platform dependent. To reconfigure all of the core framework layer code specific to one platform so that is operates properly on a different platform is an arduous task: programmers must isolate all of the platform specific code and recode and recompile it for the new platform.

Moreover, the core framework layer of the SCA specification requires that an application include an eXtensible Mark-up Language (XML) Domain profile which can be parsed by the core framework layer each time the radio is turned on or when an application is installed into the radio Domain. The result is the requirement of multiple distributed software components with the radio Domain to parse XML files.

In addition, the SCA specification has no provision for preventing an application from attempting to use a device which is busy, off-line, or disabled resulting in inefficiency in the deployment of an application under these conditions.

Also, if a device or application fails, the core framework layer is notified but then there is no provision for restarting the device or application in response.

The SCA specification also provides for only a single core framework layer Domain Manager for all devices and applications. But, if that Domain Manager fails, so does its management function resulting in a weakness in the specified core framework layer.

Finally, a given radio may have multiple channels or radio frequency paths from the modem to the antenna. Unfortunately, the SCA specification assumes only one and, as such, the Domain Manager may choose an RF path unsuitable to the waveform of the application. Also, the chosen RF path may exhibit errors resulting in a failure of the application waveform.

SUMMARY OF THE INVENTION

It is therefore an object of this invention to provide a core framework layer which meets and exceeds the SCA specification.

It is a further object of this invention to provide such a core framework layer which is platform independent, (i.e., operates on multiple embedded processors and with multiple RTOS and ORBs) and is written such that a compile option allows the software to do so.

It is a further object of this invention to provide such a core framework layer which is expressed both in source code and executable images.

It is a further object of this invention to provide such a core framework layer that uses a distributed XML parser to parse application XML files.

It is a further object of this invention to provide such a core framework layer which enables the user to install and uninstall software in a SCA compliant radio system and to enable the user to launch and tear down SCA compliant radio applications.

It is a further object of this invention to provide such a core framework layer which uses a distributed XML parser service that allows multiple distributed software components to parser JTRS XML files. Only one parser is typically required in the radio Domain.

It is a further object of this invention to provide such a core framework layer which performs the parsing function only when a new application or device is installed.

It is a further object of this invention to provide such a core framework layer which prevents an application from attempting to address a device when it is busy, off-line, or disabled.

It is a further object of this invention to provide such a core framework layer which restarts a device or application upon failure and which also optionally notifies the user that a failure has occurred.

It is a further object of this invention to provide such a core framework layer which provides for redundancy by including a primary Domain Manager and multiple secondary Domain Managers any one of which can perform the function of the primary Domain Manager if it fails.

It is a further object of this invention to provide such a core framework layer which supports multiple-channel capabilities and which can select the appropriate radio frequency path based on the application.

The invention results from the realization that a platform independent core framework layer is effected by isolating platform dependent code in one or more files for a number of different platforms and wherein each section of code is selectively compilable by a directive to reduce the dependency of the core framework layer on any one specific platform. Furthermore, by the inclusion of a distributed embedded XML parser, the core framework layer code is simplified, reduced, and rendered more effective. Furthermore, functions such as Domain Manager, Application Factory, Application, and Radio Set Manager are recognized having a tight relationship as part of a Domain Management subsystem. This invention configures the Domain Management subsystem to detect when a device is busy, off-line, or disabled to increase efficiency. The Domain Management subsystem is further configured to detect an application or device failure and to automatically restart the failed application or device in response. By including a primary Domain Management subsystem and one or more secondary Domain Management subsystems, one of the secondary Domain Management subsystems can invoke the management functions of the primary Domain Management subsystem in the event of failure. The Domain Management subsystems also uniquely selects the appropriate radio frequency path based on the requirements of the application.

This invention features an executable radio software system comprising a core framework layer responsive to one or more applications and a middleware layer, the core framework layer including isolated platform dependent code in one or more files for a number of different platforms each selectively compilable by a directive to reduce the dependency of the core framework layer on a specific platform. Typically, the middleware layer includes CORBA® (middleware layer) and RTOS and there are a plurality of compiler directives and macros.

This invention includes an embedded distributed XML parser that parses Domain profiles of the applications for more efficiently installing and running the application. The core framework layer Domain Management subsystem is preferably configured to invoke the parser only upon the installation of a new application or device.

An executable radio software system in accordance with this invention features a core framework layer responsive to one or more applications and a middleware layer, the core framework layer including a Domain Management subsystem responsive to the state of a device change for preventing application usage of a device when the device is busy, off-line, or disabled to thus more efficiently deploy the application. The Domain Management subsystem may be further configured to notify the user if the device is busy, off-line, or disabled.

Moreover, an executable radio software system in accordance with this invention features a core framework layer responsive to one or more applications and a middleware layer, the core framework layer including a Domain Management subsystem responsive to a device failure or an application failure and configured to restart the device or application in response. The Domain Management subsystem may be further configured to notify the user in the event of a device failure or an application failure.

An exemplary executable radio software system in accordance with this invention features a core framework layer responsive to one or more applications and a middleware layer, the core framework layer including one or more secondary Domain Management subsystems each configured to manage a specific Domain of a system and a primary Domain Management subsystem configured to manage all of the secondary Domain management subsystems of the system. At least one secondary Domain Management subsystem is typically configured to automatically manage the other secondary Domain Management subsystems in the case of a failure of the primary Domain Management subsystem.

Also, the executable radio software system of this invention uniquely features a core framework layer responsive to one or more applications and a middleware layer, the core framework layer including a Domain Management subsystem configured to choose a radio frequency path from a set of radio frequency paths of a communication channel selected based on the waveform requirements of the application.

Thus, one preferred executable radio software system core framework layer responsive to one or more applications and a middleware layer features isolated platform dependent code in one or more files for a number of different platforms each selectively compilable by a directive to reduce the dependency of the core framework layer on a specific platform; a middleware layer defined embedded distributed parser responsive to the SCA Domain profiles of the applications for more efficiently installing and running an application; and a Domain Management subsystem configured: to be responsive to the state of a device for preventing application usage of a device when the device is busy, off-line, or disabled to thus more efficiently deploy the application, to be responsive to a device failure or an application failure and in response to restart the device or application, to include one or more secondary Domain Management subsystem each configured to manage a specific Domain of a system and a primary Domain Management subsystem configured to manage all of the secondary Domain Management subsystems, and to choose a radio frequency path from a set of radio frequency paths of a communication channel selected based on the waveform requirements of the application.

One method of this invention includes establishing a core framework layer responsive to one or more applications and a middleware layer and isolating platform dependent code in one or more files for a number of different platforms each selectively compilable by a directive to reduce the dependency of the core framework layer on a specific platform. The typical middleware layer includes CORBA® (middleware layer) and RTOS and there are a plurality of compiler directions and macros.

Another executable radio software method features the steps of establishing a core framework layer responsive to one or more applications and a middleware layer and embedding a distributed XML parser that parses the Domain profiles of the applications for more efficiently installing and running an application. The method may further include invoking the parser only upon the installation of a new application or device. Typically, the Domain profiles are SCA defined.

Still another executable radio software method of this invention features establishing a core framework layer responsive to one or more applications and a middleware layer and responding to the state of a device change for preventing application usage of a device when the device is busy, off-line, or disabled to thus more efficiently deploy the application. This method may further include notifying the user if the device is busy, off-line, or disabled.

According to one method of this invention, a core framework layer is established to be responsive to one or more applications and a middleware layer to respond to a device failure or an application failure and to restart the device or application in response. Typically, the user is notified in the event of a device failure or an application failure.

An executable radio software method of this invention includes the steps of establishing a core framework layer responsive to one or more applications and a middleware layer; invoking one or more secondary Domain Management subsystems to manage a specific Domain of a method; and invoking a primary Domain Management subsystem to manage all of the secondary Domain Management subsystems. At least one secondary Domain Management subsystem is typically configured to automatically manage the other secondary Domain Management subsystem in the case of a failure of the primary Domain Management subsystem.

Also, an executable radio software method as defined hereby features the steps of establishing a core framework layer responsive to one or more applications and a middleware layer; and invoking a Domain Management subsystem to choose a radio frequency path from a set of radio frequency paths of a communication channel selected based on the waveform requirements of the application.

Thus, one exemplary method for a core framework layer responsive to one or more applications and a middleware layer features isolating platform dependent code in one or more files for a number of different platforms each selectively compilable by a directive to reduce the dependency of the core framework layer on a specific platform; embedding a middleware layer defined distributed XML parser that parses the SCA Domain profiles of the applications for more efficiently installing and running an application; responding to the state of a device for preventing application usage of a device when the device is busy, off-line, or disabled to thus more efficiently deploy the application; responding to a device failure or an application failure and in response to restart the device or application; invoking one or more secondary Domain Management subsystem each configured to manage a specific Domain of a method and a primary Domain Management subsystem configured to manage all of the secondary Domain Management subsystems; and choosing a radio frequency path from a set of radio frequency paths of a communication channel selected based on the waveform requirements of the application.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
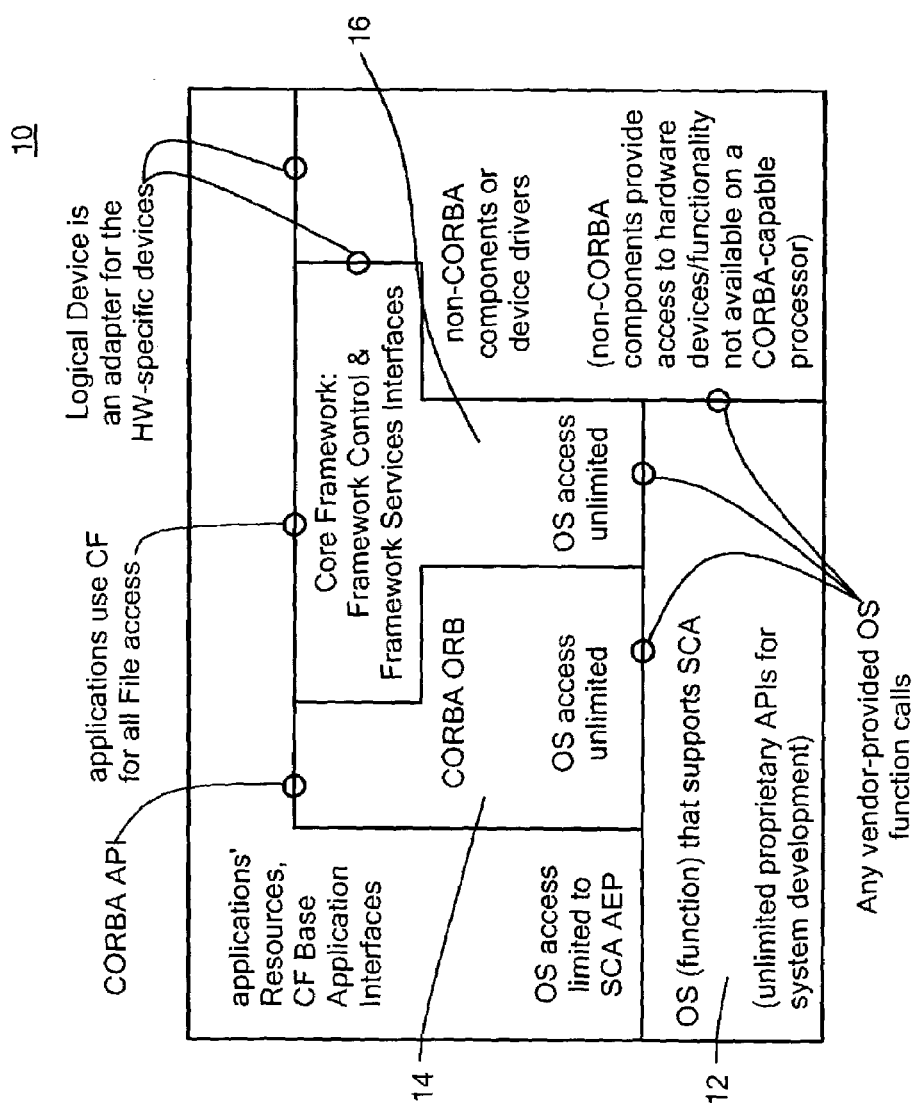
FIG. 1 is a block diagram showing the notational relationship of the core framework layer to the operating system, middleware, devices and applications of a SCA-specified radio.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Figure 2:
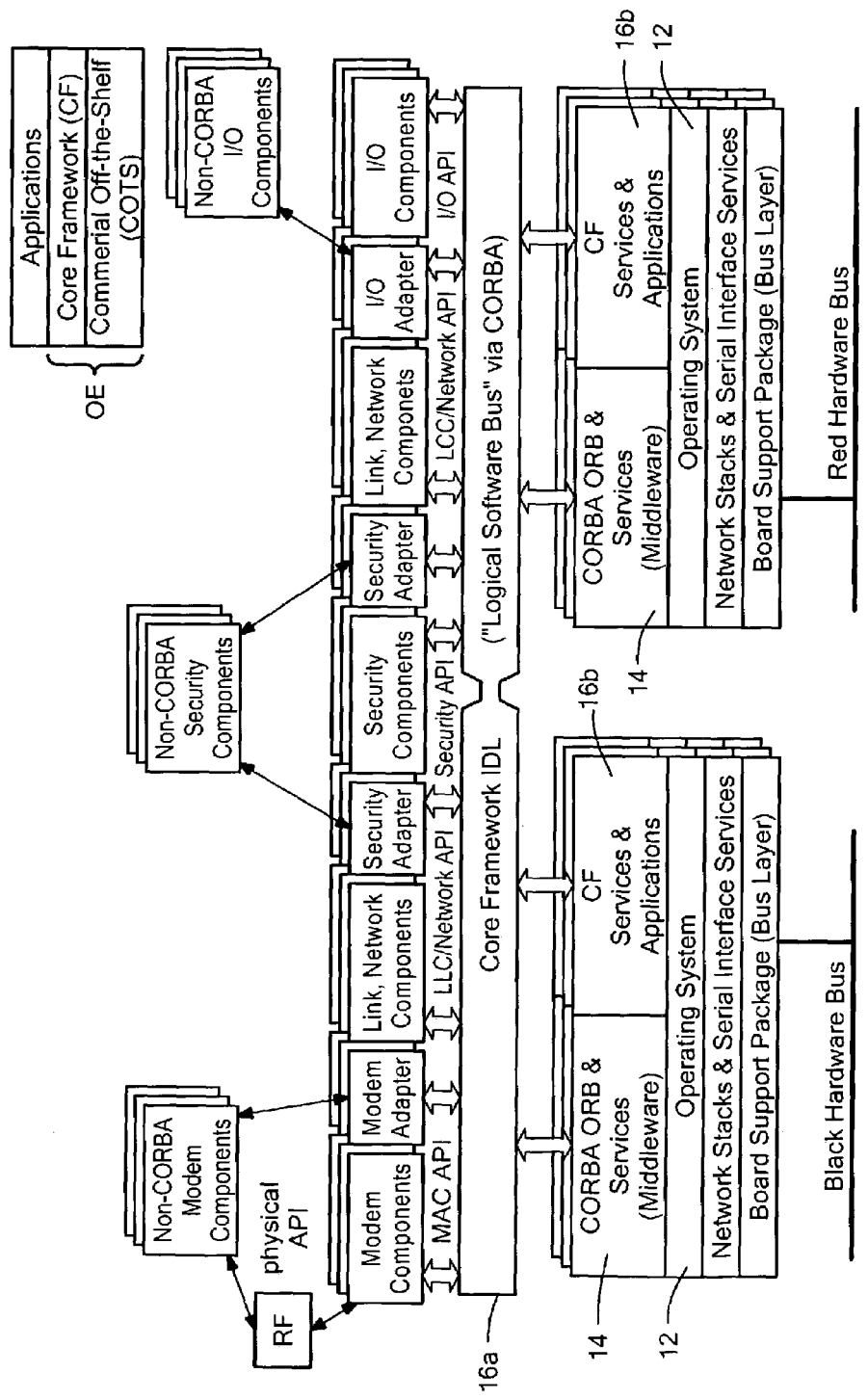
FIG. 2 is a block diagram showing the structure of the software architecture of the SCA.
Figure 3:
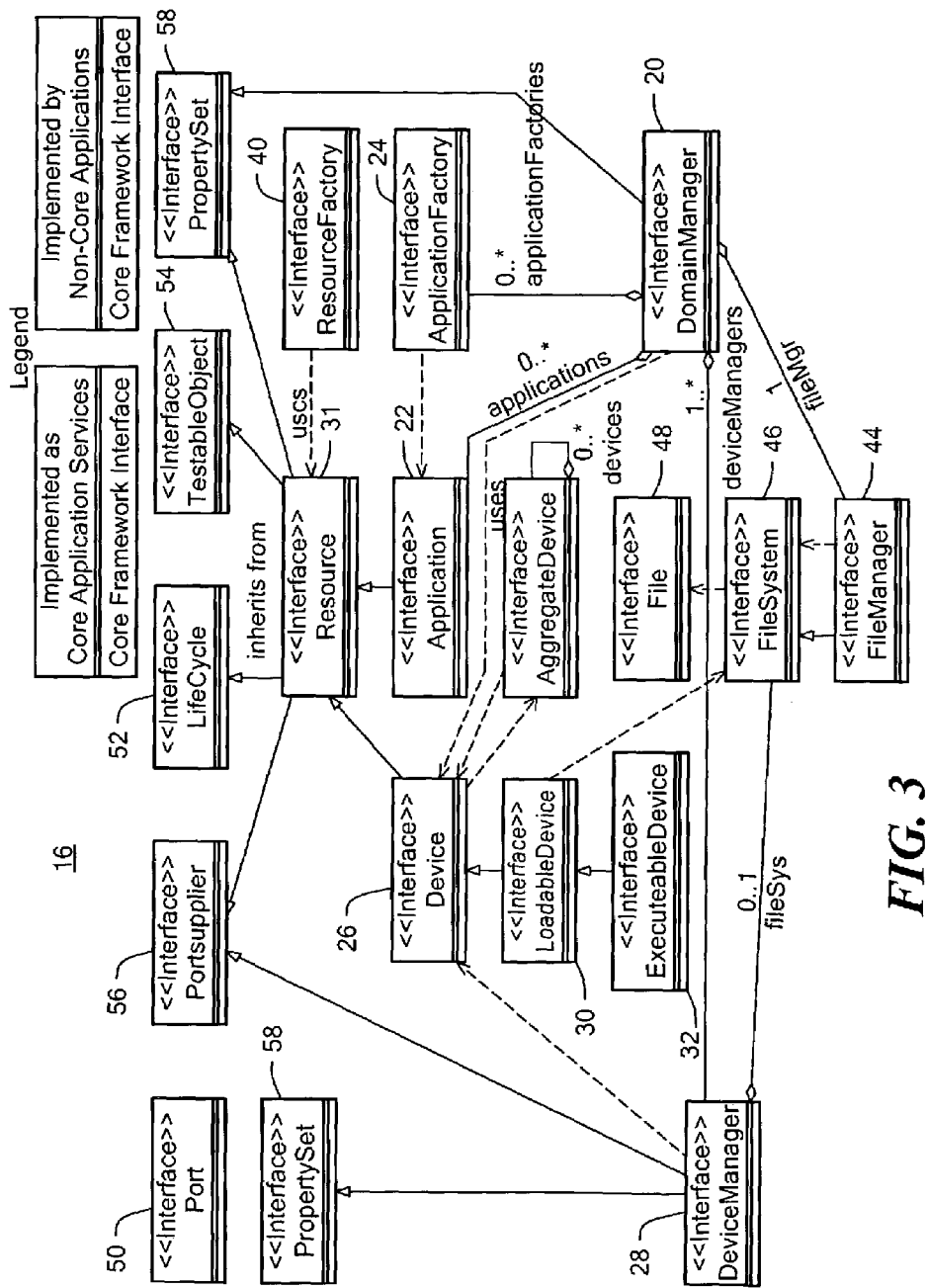
FIG. 3 is a block diagram showing the core framework layer IDL relationships.

As discussed in the background section above, the operating environment 10, FIG. 1 of an SCA compliant system includes operating system 12, and middleware layer 14. Also shown is core framework layer 16 which includes core framework layer IDL 16*a*, FIG. 2, and core framework layer services and applications 16*b*. FIG. 3 shows the key elements of core framework layer 16, namely Domain Manager 20 which manages the software applications 22, application factories 24, hardware devices 26, and Device Manager 28.

An application is a type of resource and includes one to many software resources 31 some of which may directly control the system's internal hardware devices. These resources are the logical device 26 which implements loadable device 30 or executable device 32 interfaces. For example, a modem logical device may have direct control of a modem hardware device such as a field programmable gate array (FPGA) or an application specific integrated circuit (ASIC). An I/O device may operate as a device driver to provide external access to the system. Other software resources have no direct relationship with a hardware device but perform application services for the user. For example, a network resource may perform a network layer function and a waveform link resource may perform a waveform specific link layer service. Each resource 31 can potentially communicate with other resources. Resources 31 are allocated to one or more hardware devices by application factory 24 based upon various factors including the current availability of hardware devices, the behavior rules of a resource, and the loading requirements of resource 31.

The resources managed by application 22 are middleware layer objects implementing the resource interface. The application factory 24 and application 22 interface provide a consistent way of creating up and tearing down any application within the system. Application resources can be created by using resource factory interface 40 or by the device interfaces (loadable device interface 30 and executable device interface 32). The file service interfaces, including File Manager 44, file system 46 and file 48, are used for installation and removal of application files within a system and for loading and uploading application files on the various processors that the devices execute upon. Port interface 50 provides operation for managing associations between ports. Life cycle interface 52 defines the generic operations for initializing or releasing instantiated component specific data and/or processing elements. Testable object interface 54 defines a set of operations that can be used to component implementations. Port supplier interface 56 provides the get port operation for those components that provide ports. Property set interface 58 defines configure and query operations to access component properties/attributes. A more detailed understanding of core framework layer 16, FIG. 3 can be gained by studying section 3.1.3 of the SCA specification referred to in the Background section above.

As discussed in the background section above, however, the core framework layer of the SCA specification is application independent but platform dependent. To reconfigure all of the core framework layer code specific to one platform so that it operates properly on a different platform is an arduous task: programmers must isolate all of the platform specific code and recode and compile it for the new platform. In this invention, in contrast, the platform dependent code is isolated in one or more files for a number of different platforms, each selectively compilable by compiler directives and macros to reduce the dependency of the core framework layer on a given specific platform.

As also discussed in the background section above, the core framework layer of the SCA specification requires that an application include an XML Domain profile which can be separately parsed by the core framework layer each time the radio is turned on. The result is excessive parser code, the requirement of large memory capacity for the parser code, and slow speed.

In accordance with the subject invention, in contrast, the core framework layer uniquely includes a middleware layer defined embedded distributed XML parser that parses the SCA defined Domain profiles of the applications for more efficiently installing and running the application. Furthermore, the Domain Manager is configured to invoke the parser only upon the installation of a new application or device. In this way, less code is required, less memory is required, and speed and efficiency increases. This feature is described below with respect to FIGS. 4-6. One example of the core framework Device Manager is provided in the Computer Program Listing Appendix attached hereto by DeviceManagerServant.out, a hexadecimal object code listing generated by a GNU compiler. An example of the core framework layer Abstract common library is provided in the Computer Program Listing Appendix as Abstract_x86_vxworks_v2_0h.out, a hexadecimal object code listing generated by a GNU compiler.

As also discussed in the background section above, the SCA specification has no provision for preventing an application from attempting to use a device which is busy, off-line, or disabled resulting in inefficiency in the deployment of an application under these conditions.

In the subject invention, in contrast, the unique Domain Management subsystem is responsive to the state of a device change for preventing application usage of the device when the device is busy, off-line, or disabled to thus increase the efficiency of the deployment of the application. In the preferred embodiment, the Domain Management subsystem of the subject invention is further configured to notify the user is the device is busy, off-line, or disabled. This feature is described below with respect to FIGS. 7C and 11.

Another attribute of the subject invention is that if a device or application fails, the Domain Management subsystem is configured to restart the device or application in response and also, in the preferred embodiment, to notify the user. This feature is described below with respect to FIGS. 7A and 7B.

The subject invention is also unique in that instead of only a single Domain Manager for all devices and applications, there are one or more secondary Domain Management subsystems each configured to manage a specific Domain of a system and a primary Domain Management subsystem configured to manage all of the secondary Domain Management subsystems of the system. In this way, when a secondary Domain Management subsystem determines that the primary Domain Management subsystem has failed, it takes over the management functions of the primary. The result is a redundancy not provided for in the SCA specification. This feature is described below with respect to FIG. 8.

Finally, as stated in the Background section above, a given radio may have multiple channels or radio frequency paths from the modem to the antenna. Unfortunately, the SCA specification assumes only one and, as such, the Domain Management subsystem may choose a radio frequency (RF) path unsuitable to the waveform of the application. Also, the chosen RF path may exhibit errors resulting in a failure of the application waveform.

In the subject invention, in contrast, the Domain Management subsystem is configured to choose an RF path from a set of RF paths of the communication channel selected based on the application's waveform, typically the waveform modem component requirements. This feature is discussed in more detail below with respect to FIGS. 9-11.

Figure 4:
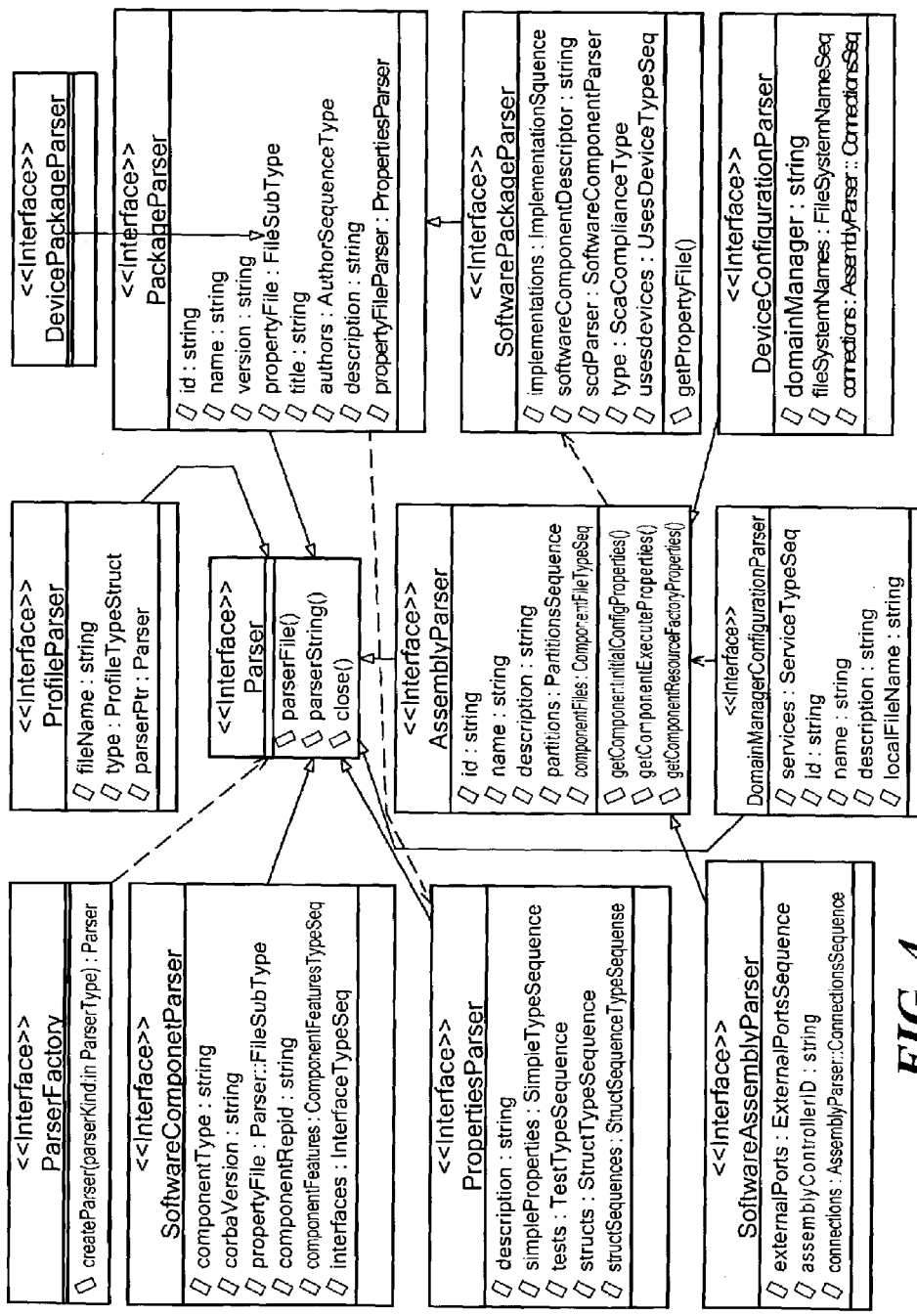
FIG. 4 is a UML diagram showing the parser IDL definitions of the subject invention.

FIG. 4 denotes the middleware layer parser interfaces definitions and provides an overview of their relationships to one another. These interfaces are used to access information from the SCA Domain Profile XML files for installed applications and deployment of devices by a DeviceManager. This definition allows the Domain profile parser component to be deployed any where within the radio system and be accessible by all components (DomainManager 20, FIG. 3; DeviceManagers 28, FIG. 3; Human Computer Interfaces (HCI), and the like) that require XML parsing.

Figure 5A:
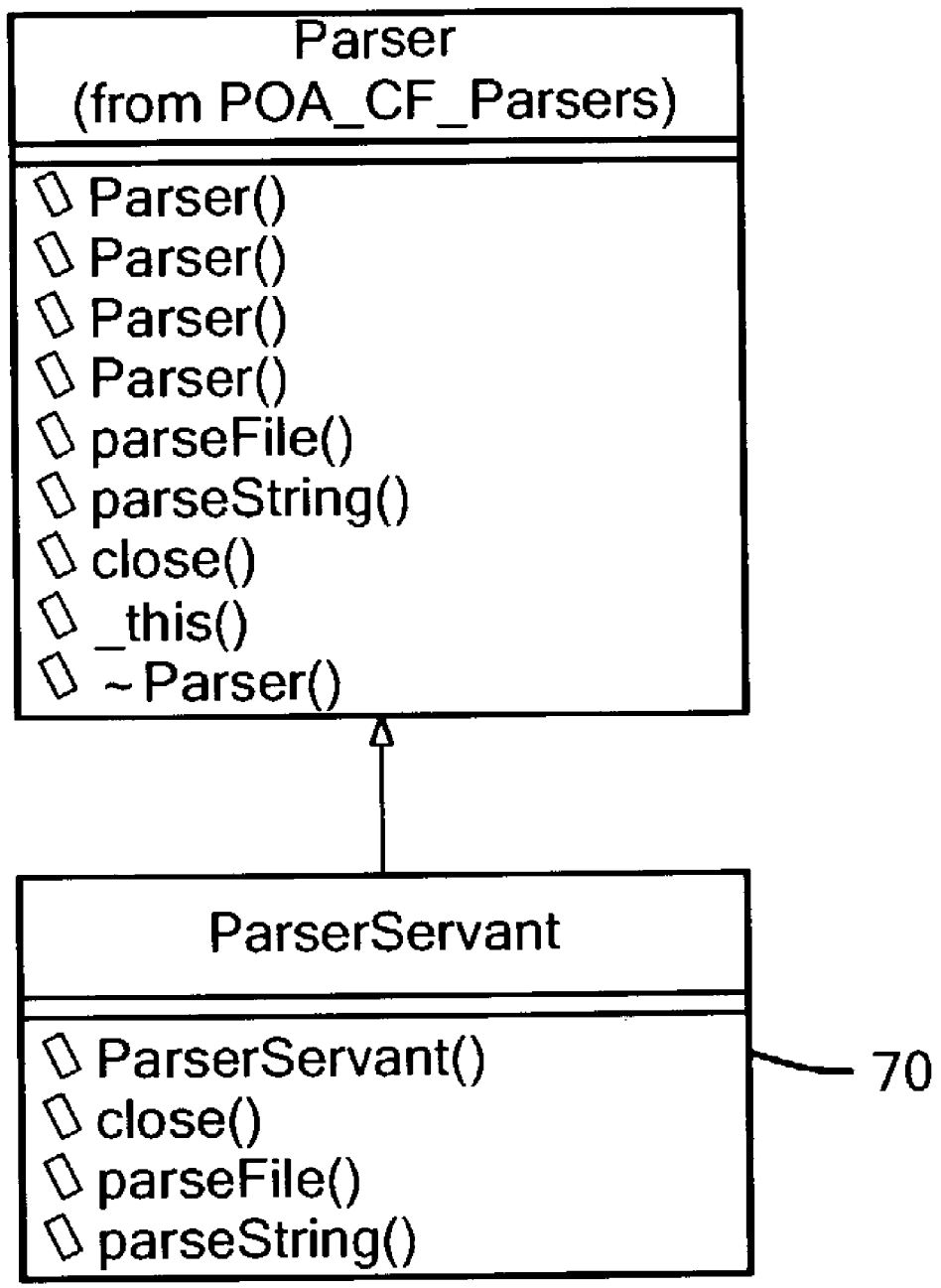
FIGS. 5A-5C are UML parser IDL implementations denoted "servant" classes.
Figures 5B, 5C, 5D, 5E, 5F:
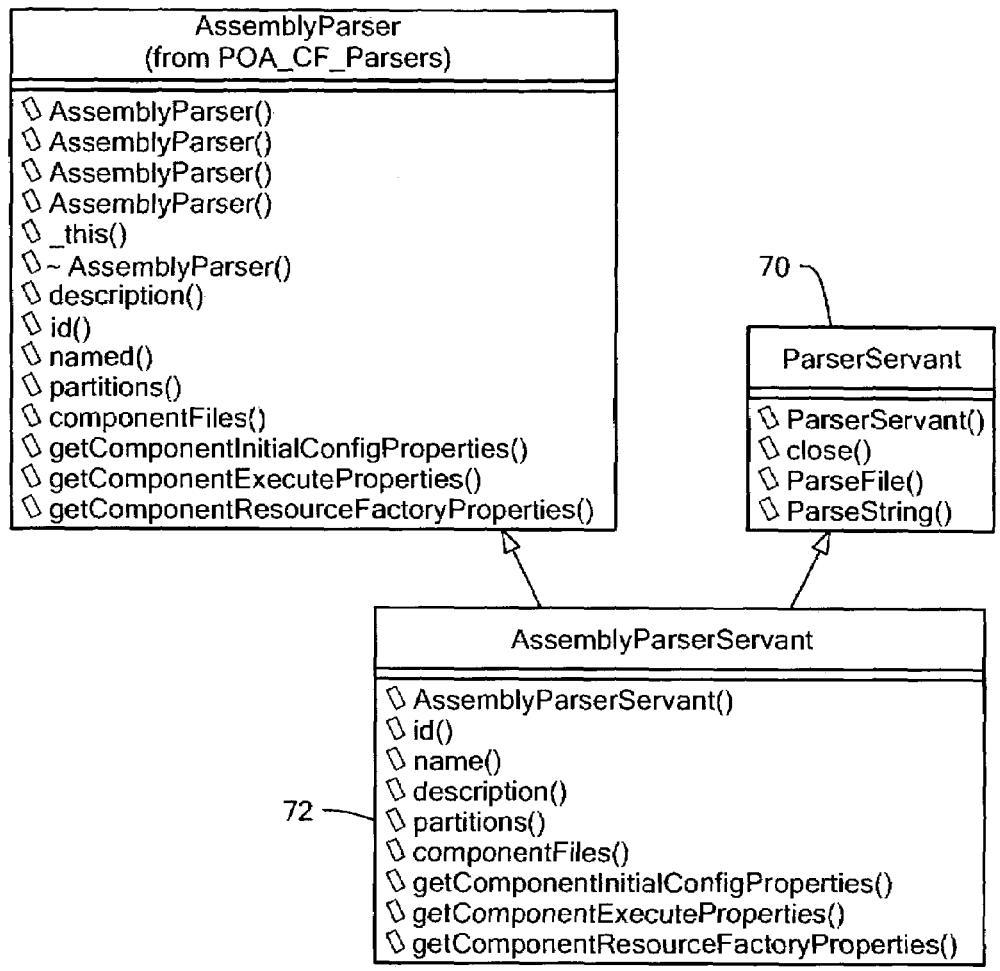
Figure 5D:
Figure 5E:
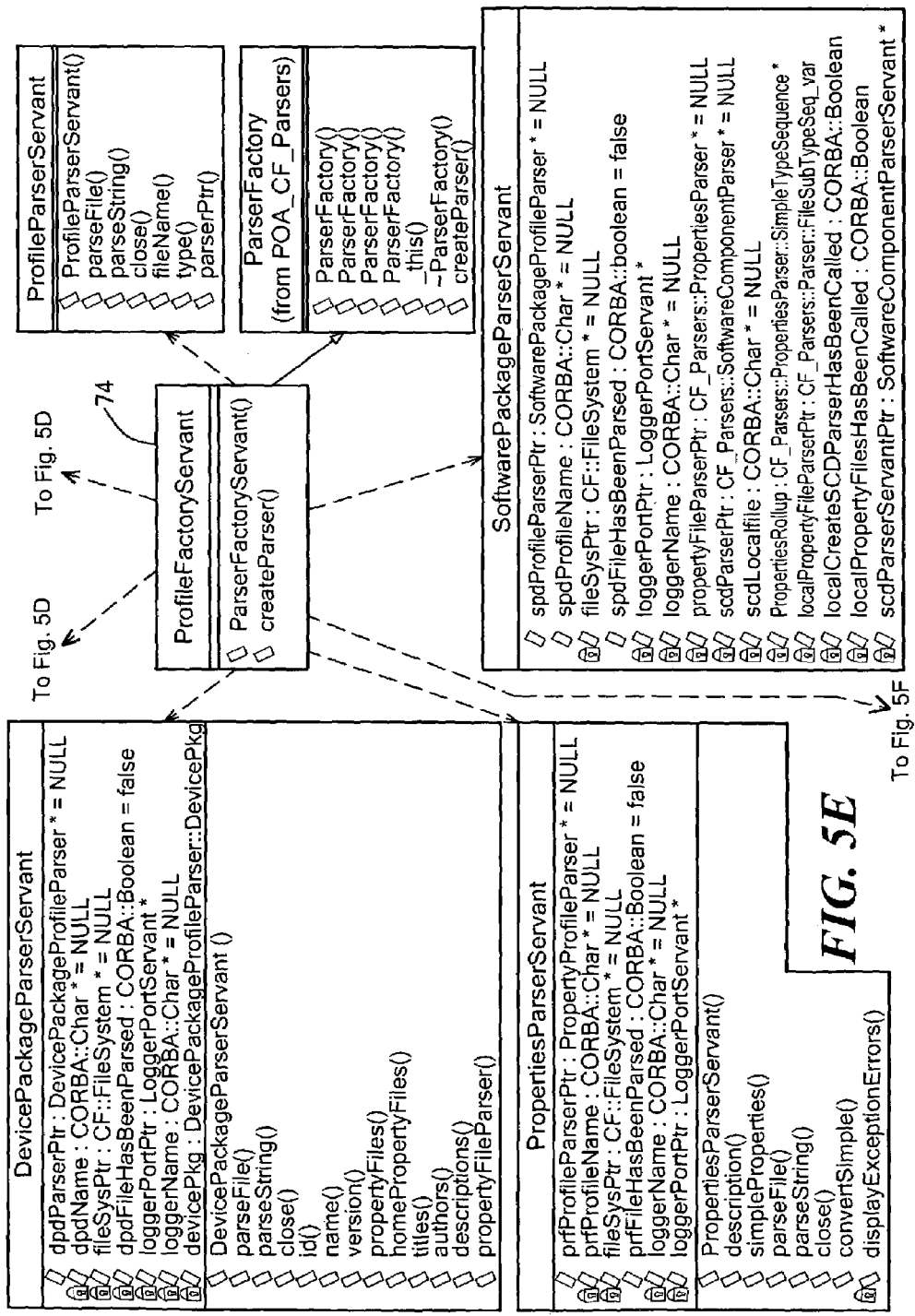
Figure 5F:
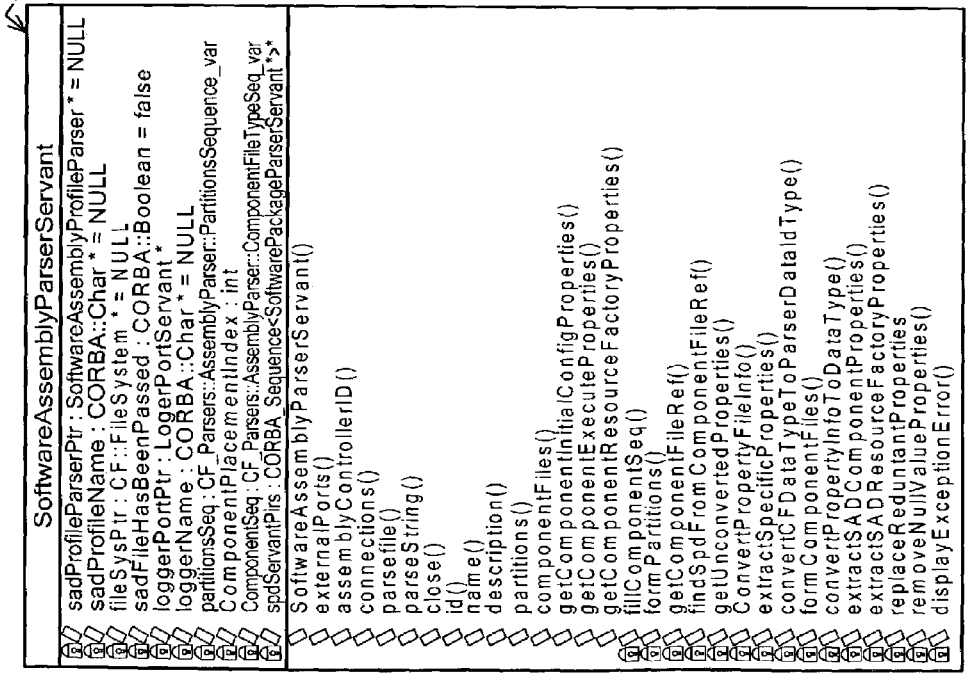

The preferred distributed XML parser implementation of this invention includes many classes. FIGS. 5A-5C describe the key implementation classes (e.g., has the suffix name "servant") that realize the Distributed XML Parser middleware layer IDL interfaces as depicted in FIG. 4. The classes that begin with "POA" are implementation classes generated from a vendor's middleware layer IDL to C++ compiler. ParserServant 70 is the implementation for the Parser middleware layer interface. AssemblyParserServant 72 is the implementation for the AssemblyParser middleware layer interface. ParserFactoryServant 74 is the implementation for the ParserFactory middleware layer interface. The ParserFactoryServant creates an instance of one of the Parser types (e.g., SAD, Properties, DCD, Software Package, etc.) as denoted by the dependency dashed arrow line.

Figure 6:
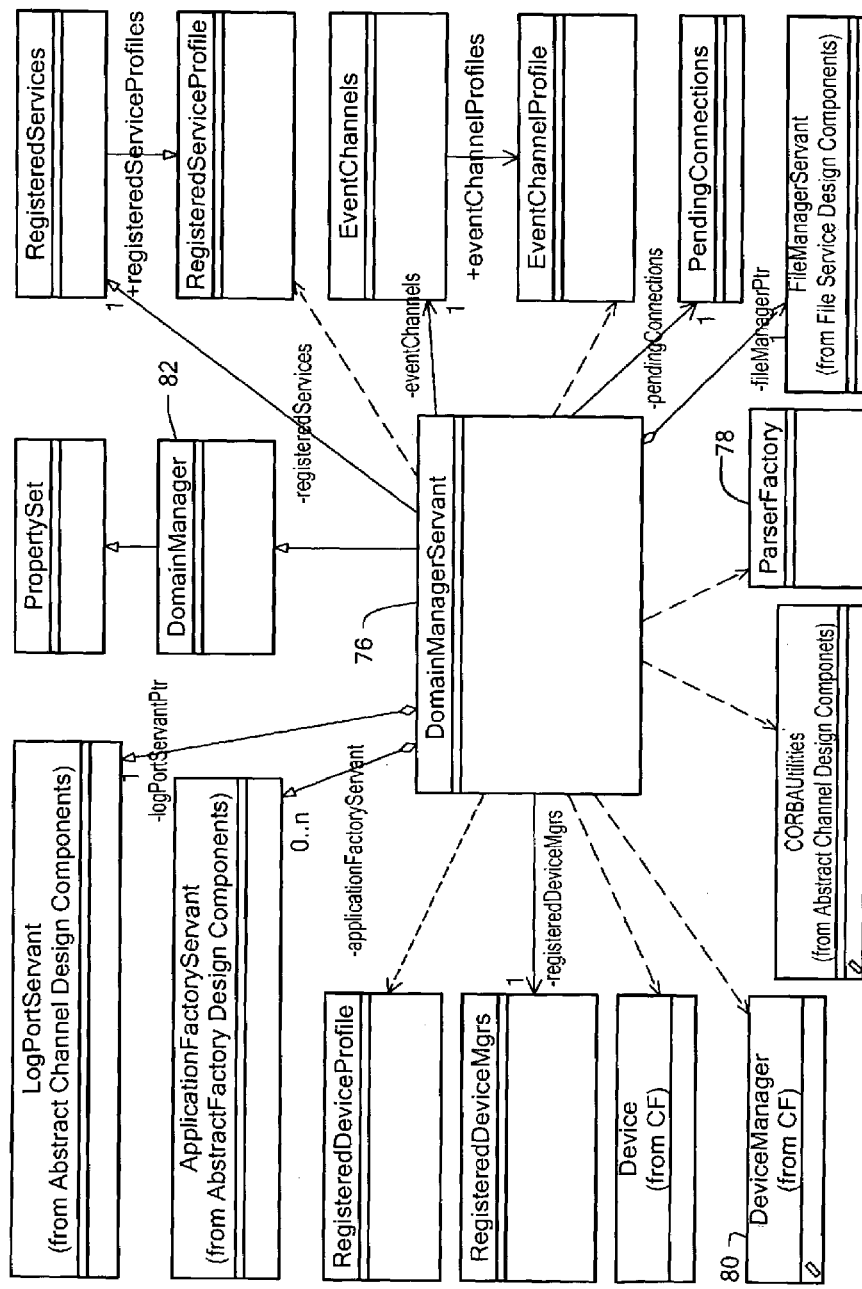
FIG. 6 is a UML diagram denoting the user Domain Manager design dependency on the parser IDL.

FIG. 6 shows the preferred definition of DomainManagerServant 76. DomainManagerServant 76 has a dependency to the ParserFactory middleware layer client-side class. ParserFactory 78 is used to cerate a Parser object (SCA Domain Profile XML Files, SoftwareAssemblyDescriptor, Properties, etc.). The Parser object returned from ParserFactory 78 is used to access the information from the XML files. DomainManagerServant 76 implementation uses the middleware layer client-side Parser classes for parsing the SCA Domain Profile XML files during installation of an application, and registration of Devices and DeviceManagers.

XML parsing is preferably only performed once during the initial installation and/or registration behavior. When the system reboots, parsing is only done for new items installed or registered into the radio or system. DeviceManager 80, like DomainManager 82 uses ParserFactory 78 and Parser classes to deploy the devices and services as described in a SCA DeviceConfigurationDescriptor file.

Figure 7A:
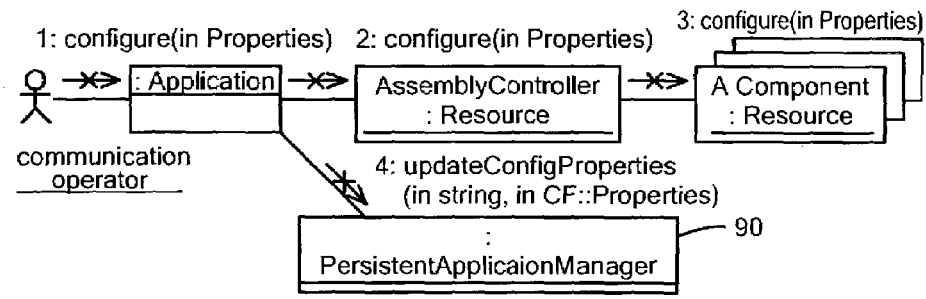
FIGS. 7A-7C show UML collaboration diagrams depicting scenarios of the Domain Management system implementation of persistent application properties configuration, application failure recovery, and device state change event.
Figure 7B:
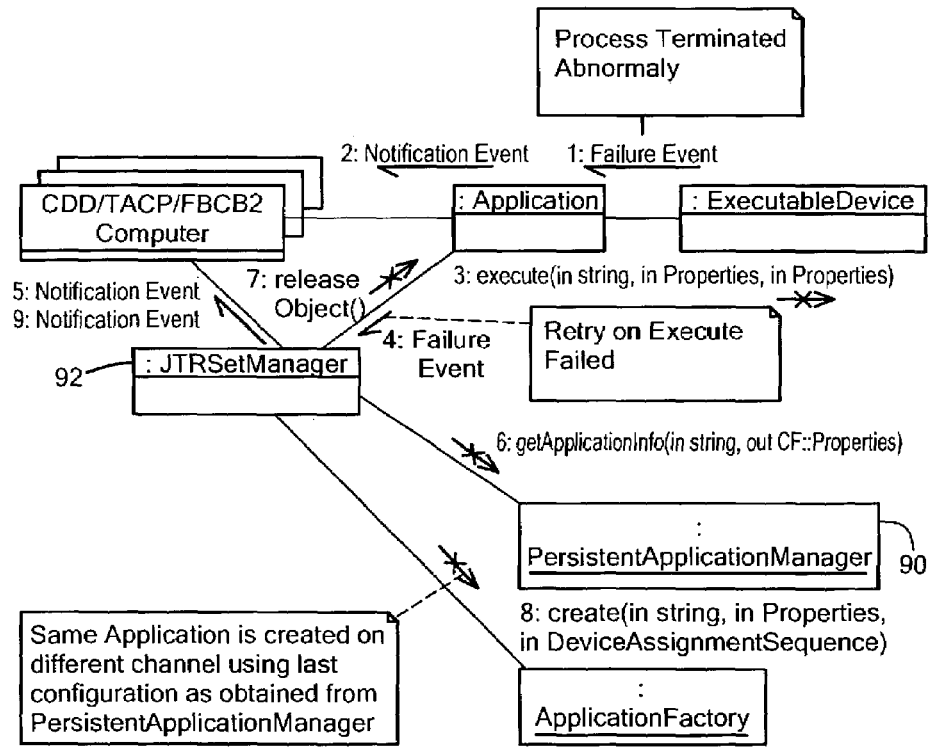

FIGS. 7A-7B illustrate the unique implementation of the SCA core framework layer (CF) application which is preferably augmented with failure recovery behavior. FIG. 7A illustrates how the implementation saves the current application configuration for each configure update by using PersistentApplicationManager service 90. FIG. 7B illustrates the failure recovery behavior for the ExecutableDevice, Application and JTRSetManager (a type of DomainManager). The ExecutableDevice detects an executable component failure and sends a failure event, which indicates the type of failure. The core framework layer implementation processes this failure and attempts a recovery of the failed component by redeploying on the component on the ExecutableDevice. When unsuccessful with the redeployment, the core framework layer sends a failure event to a radio Manager (DomainManager or JTRSetManager) implementation processes.

The radio Manager, in this scenario JTRSetManager 92, retrieves the application's current configuration and device information before terminating the application, since the application implementation removes the application configuration from PersistentApplicationManager 90 upon termination. After retrieving the application's configuration, the radio Manager creates the application using the obtained configuration so the redeployed application is configured with the same operating parameters as before it was restarted. The IncomingDomainManagementEventChannel, (not shown in figures), is used to send the failure events.

Figure 7C:
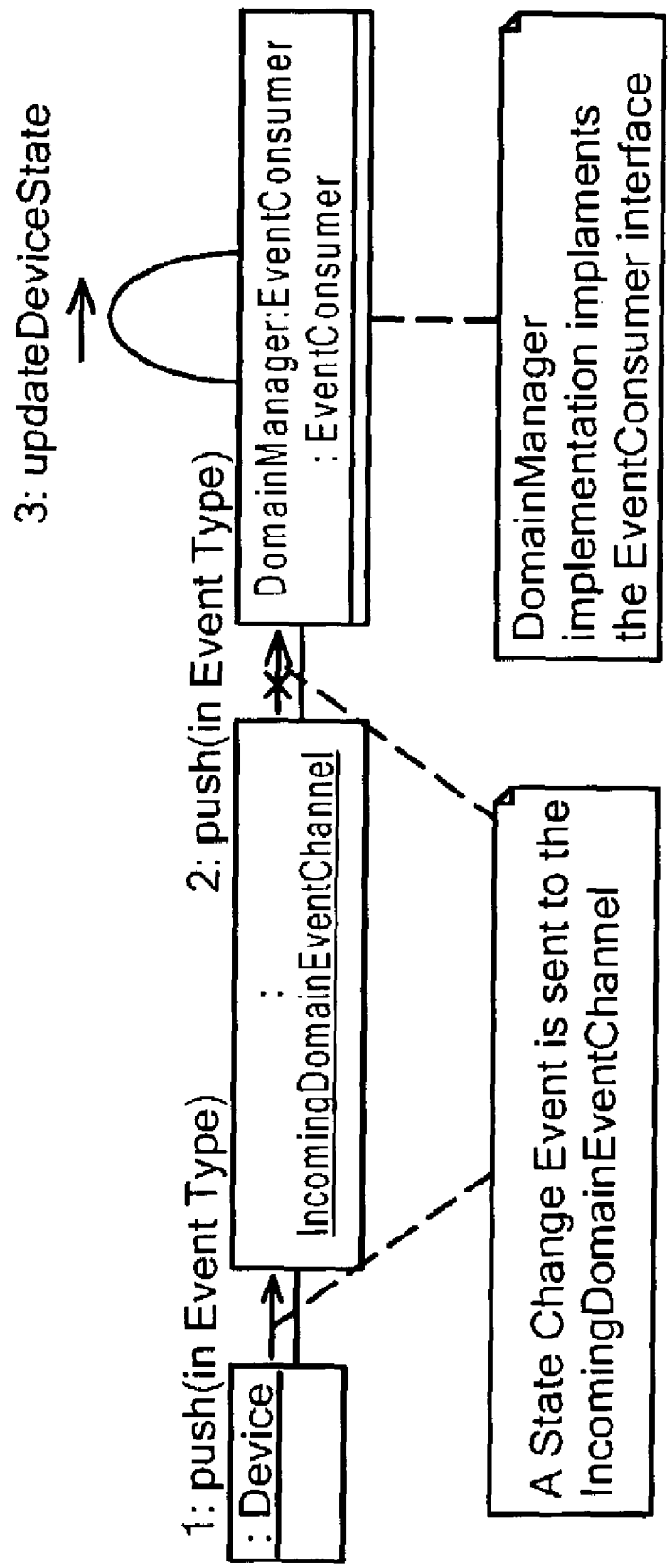
Figure 11A:
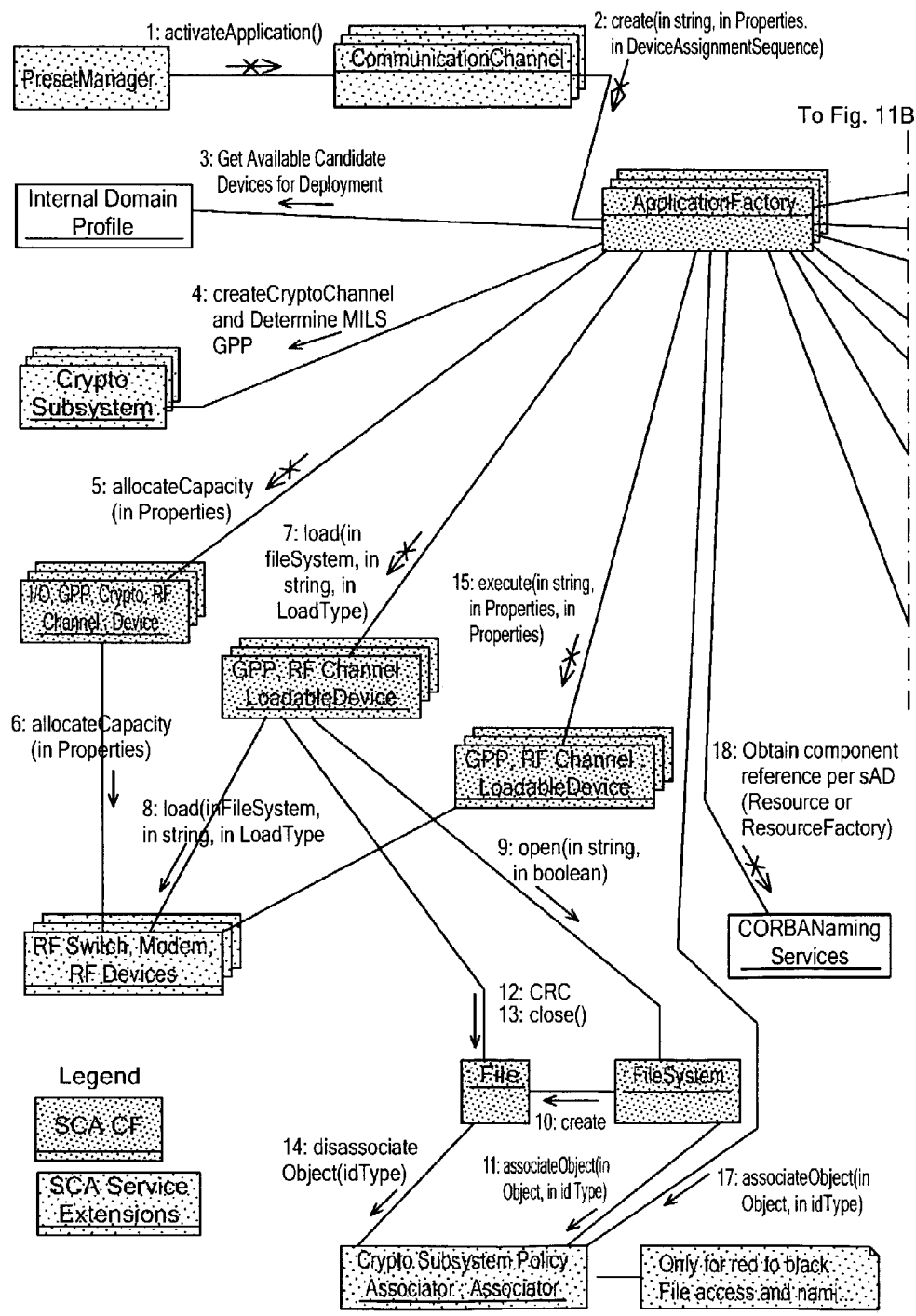
FIG. 11 is a UML Sequence Diagram illustrating the behavior of the Application Factory, Communication Channel, RF Channel, Persistent Application Properties, and Get Available Devices (not offline, busy, and enabled).
Figure 11B:
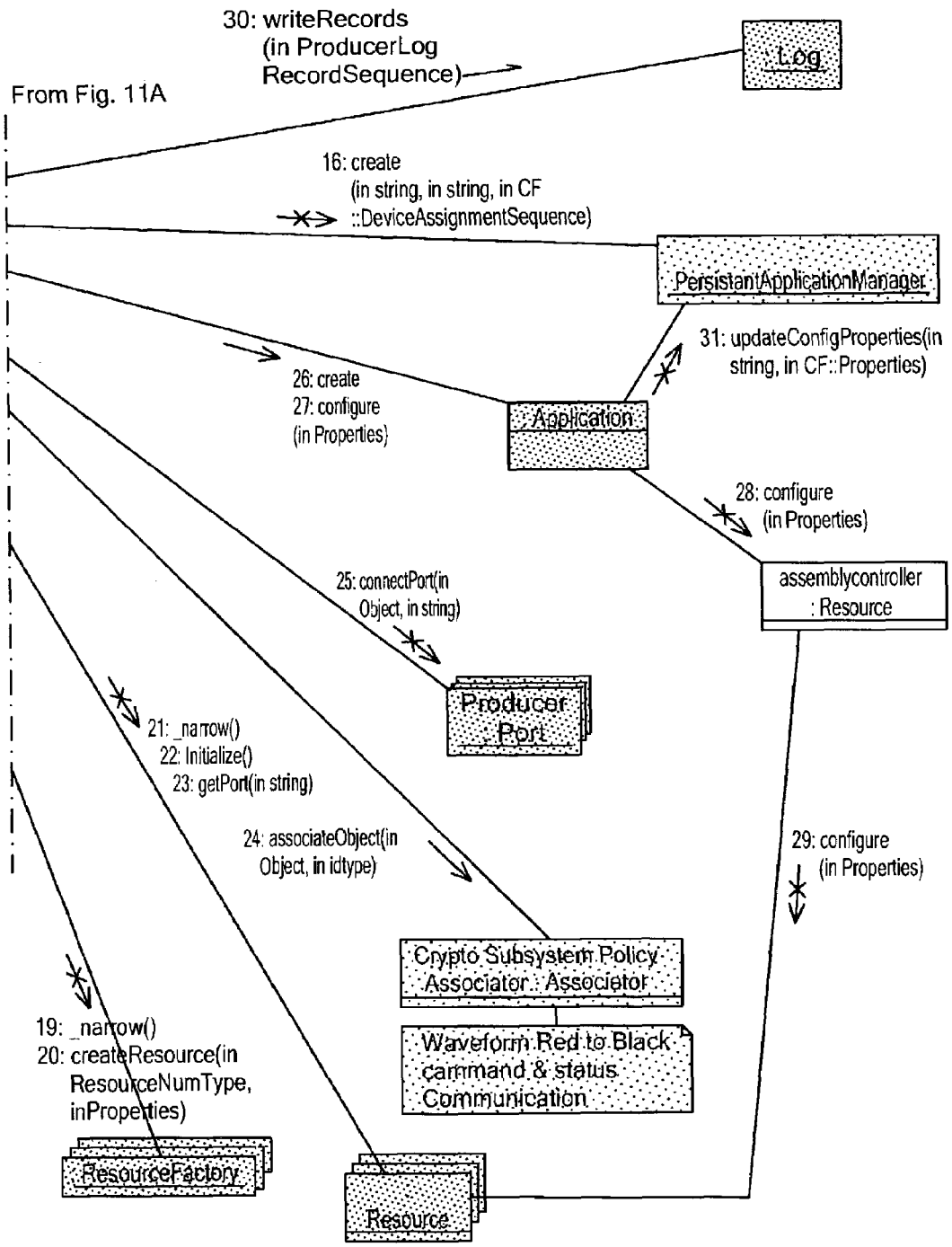

FIG. 7C depicts the device state change behavior for the Domain Manager. FIG. 11 depicts Application instantiation by the Application Factory, which are: the use of the PersistentApplicationFactory and obtaining available and capable Devices based upon the current state the device is in. The radio Manager (DomainManager or Radio Set Manager (e.g., JTRSetManager) implementation processes device state change events and updates its local Domain profile to reflect the current state of the radio devices as shown. The Application and Application Factory implementations make use of this information before trying to use a registered device to a radio Manager.

The unique implementation of the radio set Manager (e.g., JTRSetManager 92, FIG. 8) is twofold. First, as DomainManagers registered in to the radio set Manager, a middleware layer group interoperable object reference (IOR) is built up with JTRSetManager 92 being the primary (IOR) implementation and the registered DomainManagers that are JTRSetManager types are added as secondary IORs in the group IOR list. This implementation behavior is based upon COTS. The IOR given out by a radio set Manager is this group IOR list. The implementation relies the middleware layer ORB client capability to use a group IOR, which will automatically use a secondary IOR when the primary IOR fails. Second, replicated information is sent to the registered DomainManagers that are radio set Manager types (e.g., JTRSetManager) by the use of the event channel. The primary JTRSetManager registers to the OutgoingDomainManagementEventChannels of each registered DomainManager.

Figure 9:
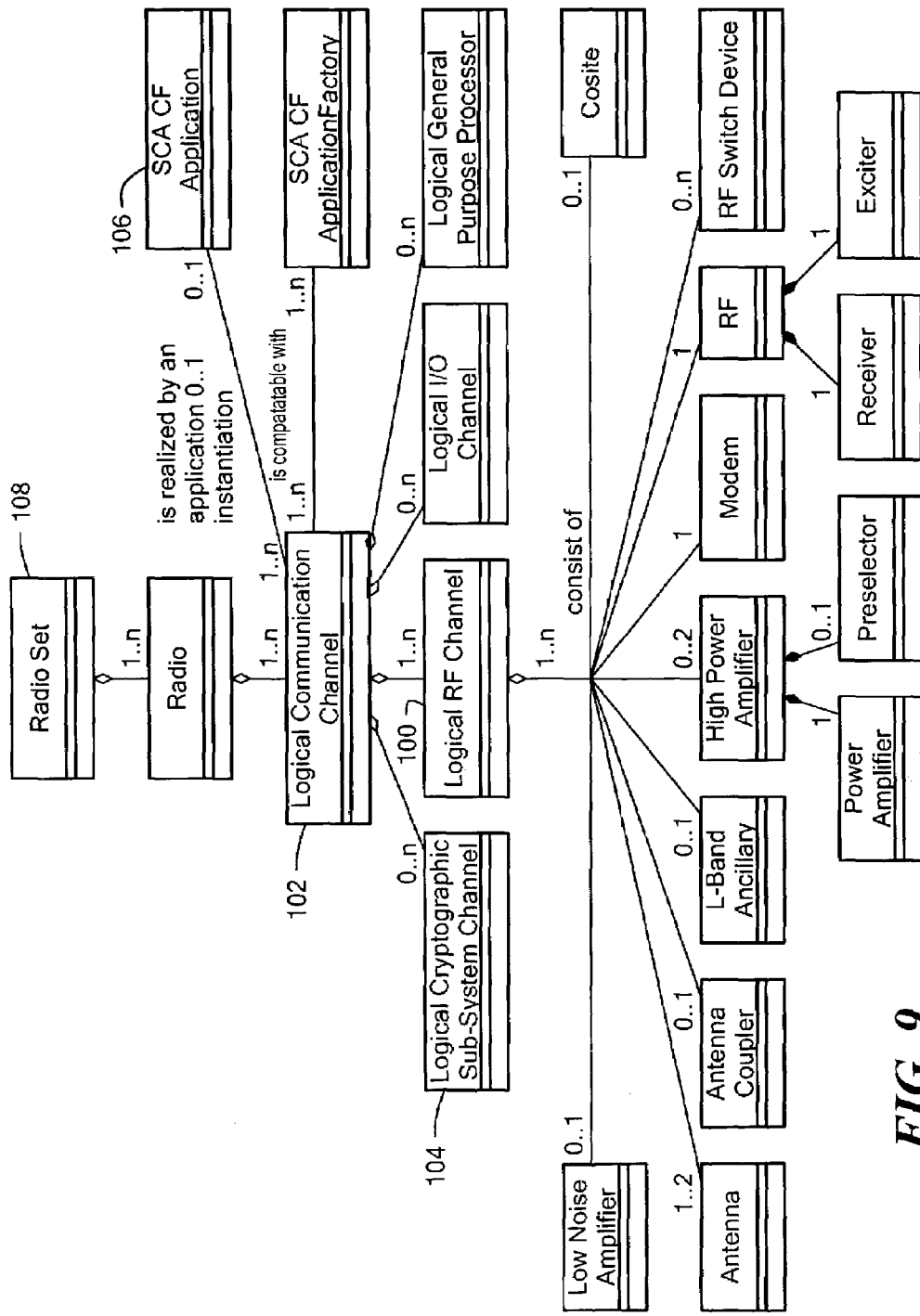
FIG. 9 is a UML class diagram denoting the definition of a Communication Channel and RF Channel.

As shown in FIG. 9, each radio contains one-to-many logical communication channels, where a logical communication channel (also can be known as waveform channel) is a communication path comprising all elements from baseband to RF as shown. An instantiated logical communication channel 102 consists of a set of logical RF channels 100, logical Cryptographic Sub-System (CS/S) channels 104, logical general-purpose processors and logical I/O channels along with an instantiated SCA CF Application

106. An instantiated Application may use more than one logical communication channel. The maximum number of logical communication channels in a Radio Set 108 is determined by the unique set of logical RF channels, each of which usually maps to a modem. The available number of logical communication channels equals the maximum number of logical communication channels minus the logical RF channels in use.

Modem and RF hardware devices along with ancillary hardware devices (e.g., power amplifiers, antennas, switches, couplers.) support one to many transmit and and/or receive hardware (communication) paths to an antenna. Each wired hardware path from modem to an antenna is represented as a logical RF channel in a JTR. The logical RF channel is associated with the logical Devices (modem, RF switches, power amplifiers, etc.) that make up the actual wired hardware path from modem to antenna. As shown in FIG. 9, the modem, RF, and ancillary Devices may be associated with many logical RF channels and a logical RF channel may have different combinations of these Devices. The logical RF channel has a set of capacities (allocation properties) that is a roll up of the capacities of all the logical Devices that make up one communication path from modem to antenna configuration. The capacity definitions are standardized for modem, RF, power amplifier, RF switch, and antenna Devices, and are waveform independent.

Figure 10:
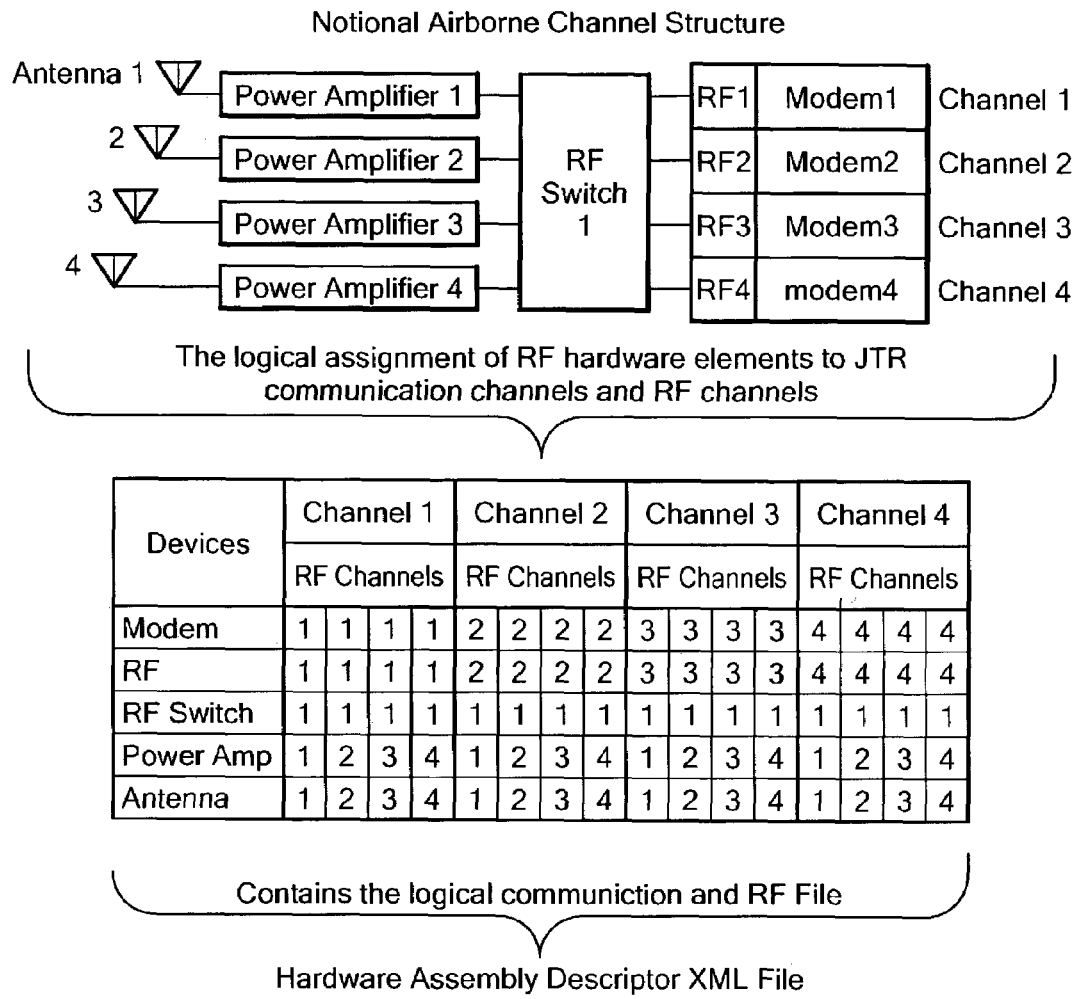
FIG. 10 is an illustration of the concept of a communication and RF Channels, and what a Hardware Assembly Description (HAD) XML file would typically contain.

The logical RF Channel and its Device associations are captured in the Hardware Assembly Descriptor (HAD) XML File. The HAD file can be manually created or automatically created from a Radio Set Hardware Configuration Tool that depicts hardware (I/O) wiring configurations. The capability for associating a variety of RF ancillaries to a logical channel is accomplished via melding the HAD with RF switching capability as shown in FIG. 10. Thus RF switching provides multiple RF channel definitions and the HAD allows for flexible assignment of RF devices to channels to meet operational requirements.

The DeviceManager and/or DomainManager builds up relationships among Devices by adding (associating) Devices to the appropriate Devices as described in the Device Configuration Descriptor (DCD) and HAD XML files, FIG. 10.

Figure 8:
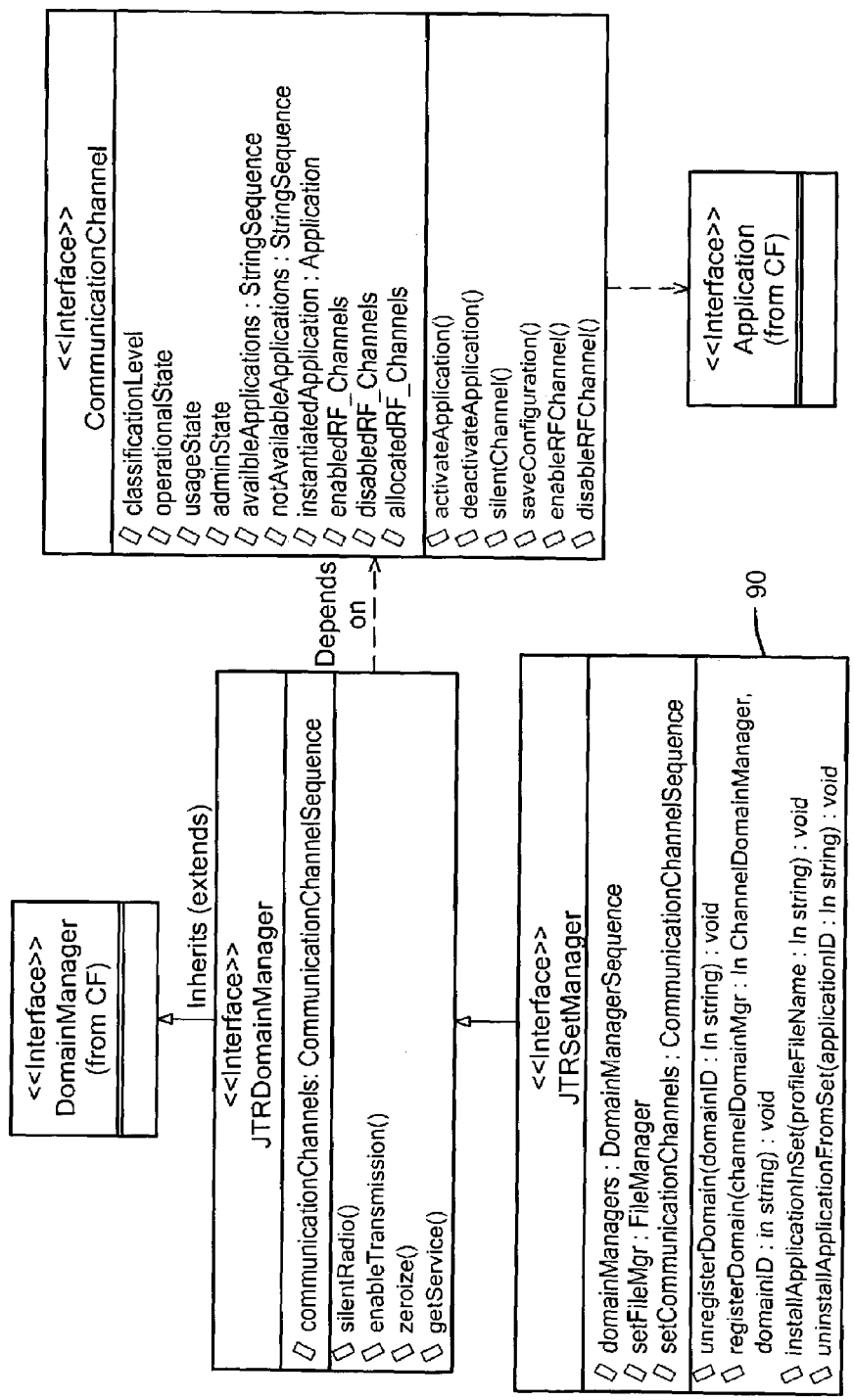
FIG. 8 is a UML class diagram denoting the definition of a set Manager for multiple Domains.

FIG. 8 illustrates the Communication Channel interface definition. FIG. 11 illustrates the behavior of the Application Factory deploying an application's components on an RF channel.

In this way the novel core framework layer of this invention meets and exceeds the SCA specification, is platform independent, and employs a distributed COTS parser to parser XML Domain profiles resulting in a core framework layer which uses less code, less memory, and is faster when performing the parsing function.

In addition, the novel core framework layer of this invention prevents an application from attempting to address a device when it is busy, off-line, or disabled, exhibits greater efficiency, and automatically restarts a device or application upon failure. The novel core framework layer of this invention provides for redundancy by including a primary Domain Manager and multiple secondary Domain Managers anyone of which can perform the function of the primary Domain Manager if it fails. Also, the core framework layer has multiple-channel capabilities and can select the appropriate radio frequency path based on the application. Such a core framework layer is designed to be an open system architecture that enables use on simultaneous voice, video, and data operations over multiple channels, it promotes software portability by using open standards such as the SCA, POSIX, 0MG CORBA® (middleware layer), XML, and 0MG CORBA® (middleware layer) components, and it allows radio systems to be programmed and reprogrammed with waveform applications and to allow waveform software to be installed to allow for multiple waveform instantiations, waveform teardown, and waveform application uninstallation. In addition, the core framework layer of this invention is operable on Pentium, Power-PC, StrongArm, and other processors.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. An executable radio software system core framework layer stored in a computer storage medium and executed by a processor or computer responsive to one or more applications and a middleware layer, the core framework layer comprising:
   isolated platform dependent code in one or more files for a number of different platforms each selectively compilable by a directive to reduce a dependency of the core framework layer on a specific platform;
   middleware layer defined embedded distributed parser responsive to Software Communication Architecture SCA Domain profiles of the applications for more efficiently installing and running an application; and
   a Domain Management subsystem configured:
      to be responsive to the state of a device for preventing application usage of a device when the device is busy, off-line, or disabled to thus more efficiently deploy the application,
      to be responsive to a device failure or an application failure and in response to restart the device or application,
      to include one or more secondary Domain Management subsystem each configured to manage a specific Domain of a system and a primary Domain Management subsystem configured to manage all of the secondary Domain Management subsystems, and
      to choose a radio frequency channel of a set of radio frequency channels based on waveform application characteristics.

2. The system of claim 1 in which the Domain Management subsystem is configured to invoke the parser only upon the installation of a new application or device.

3. The system of claim 1 in which the Domain Management subsystem is further configured to notify the user if the device is busy, off-line, or disabled.

4. The system of claim 1 in which the Domain Management subsystem is further configured to notify the user in the event of a device failure or an application failure.

5. The system of claim 1 in which at least one secondary Domain Manager is configured to manage the other secondary Domain Managers in the case of a failure of the primary Domain Manager.

6. An executable radio software method for a core framework layer responsive to one or more applications and a middleware layer, the method comprising:

isolating platform dependent code in one or more files for a number of different platforms each selectively compilable by a directive to reduce the dependency of the core framework layer on a specific platform;

embedding a middleware defined distributed parser responsive to Software Communication Architecture Domain profiles of the applications for more efficiently installing and running an application;

responding to the state of a device for preventing application usage of a device when the device is busy, off-line, or disabled to thus more efficiently deploy the application;

responding to a device failure or an application failure and in response to restart the device or application;

invoking one or more secondary Domain Management subsystem each configured to manage a specific Domain of a method and a primary Domain Management subsystem configured to manage all of the secondary Domain Management subsystems; and choosing a radio frequency channel of a set of radio frequency channels based on waveform application characteristics.

7. The method of claim 6 in which the Domain Management subsystem is configured to invoke the parser only upon the installation of a new application or device.

8. The method of claim 6 in which the Domain Management subsystem is further configured to notify the user if the device is busy, off-line, or disabled.

9. The method of claim 6 in which the Domain Management subsystem is further configured to notify the user in the event of a device failure or an application failure.

10. The method of claim 6 in which at least one secondary Domain Manager is configured to manage the other secondary Domain Managers in the case of a failure of the primary Domain Manager.

* * * * *